(12) United States Patent
Xing et al.

(10) Patent No.: US 6,815,391 B2
(45) Date of Patent: Nov. 9, 2004

(54) METHOD OF PREPARING NANO-LEVEL PLATINUM/CARBON ELECTROCATALYST FOR CATHODE OF FUEL CELL

(75) Inventors: Wei Xing, Changchun (CN); Xuguang Li, Changchun (CN); Tianhong Lu, Changchun (CN)

(73) Assignee: Changchun Institute of Applied Chemistry Chinese Academy of Science, Changchun (CN)

(*) Notice: Subject to any disclaimer, the term of this patent is extended or adjusted under 35 U.S.C. 154(b) by 6 days.

(21) Appl. No.: 10/424,215

(22) Filed: Apr. 25, 2003

(65) Prior Publication Data
US 2003/0224926 A1 Dec. 4, 2003

(30) Foreign Application Priority Data
Apr. 30, 2002 (CN) .......................................... 2118282 A

(51) Int. Cl.[7] .......................... H01M 4/88; H01M 4/86; B01J 21/18; B01J 23/02; B01J 23/40
(52) U.S. Cl. ....................... 502/184; 502/101; 502/185; 502/339; 423/460; 429/40; 429/42; 429/43
(58) Field of Search ................................ 502/101, 184, 502/185, 230, 339; 429/40, 42, 43; 423/460

(56) References Cited

U.S. PATENT DOCUMENTS

| | | | | |
|---|---|---|---|---|
| 5,906,716 A | * | 5/1999 | Mertesdorf et al. | 204/296 |
| 6,518,217 B2 | * | 2/2003 | Xing et al. | 502/230 |
| 6,602,630 B1 | * | 8/2003 | Gopal | 429/30 |

* cited by examiner

Primary Examiner—Mark L. Bell
Assistant Examiner—Patricia L. Hailey
(74) Attorney, Agent, or Firm—Knobbe, Martens, Olson & Bear, LLP

(57) ABSTRACT

The present invention relates to a method for preparing nano-level Pt/C electrocatalyst for cathode of fuel cell. By employing ammonium chloride, potassium chloride, ammonium bromide, potassium bromide, ammonium iodide or potassium iodide as anchoring agent for the chloroplatinic acid, the present invention realizes the preparation of Pt/C electrocatalyst with platinum micro-particles homogeneously distributed in the interstices as well as on the surfaces of the active carbon. The sizes of the platinum particles in the catalyst are homogeneous and their average diameter is in the range of 2.5 to 4.5 mm. The present method is a novel one for preparing nanometer level Pt/C electrocatalyst. Said electrocatalyst possesses high specific activity per unit mass for the catalytic reduction of oxygen.

10 Claims, 7 Drawing Sheets

METHOD OF PREPARING NANO-LEVEL PLATINUM/CARBON ELECTROCATALYST FOR CATHODE OF FUEL CELL

RELATED APPLICATIONS

This application claims priority to the Chinese Patent Application 02118282.5, filed Apr. 30, 2002, which is incorporated herein by reference in its entirety.

BACKGROUND OF THE INVENTION

1. Field of the Invention

The present invention relates to a method of preparing nano-level Pt/C electrocatalyst for cathode of fuel cell.

2. Description of the Related Art

Polymer electrolyte membrane fuel cells (PEMFC) have the characteristics of high energy transfer efficiency, low pollution to environment, mild operating condition, small volume, right weight, safety in use and long lasting. They are comparatively suitable to be used as power source for vehicles and portable electrical source. At present, much attention is focused on the researches of PEMFC by many countries in the world. Reduction of oxygen is the reaction taken place at the cathode of PEMFC. The performance of this reaction will directly influence the voltage and output power of the whole cell, and the performance of the cathode depends mainly on the catalytic properties of the cathodic-electrocatalyst. Up to now, the cathodic electrocatalysts which have been studied include mainly the following: (1) platinum and its alloys; (2) macrocyclic compounds of transition metals, especially those of porphyrin and phthalocyanine compounds having Fe or Co as the central metal ion; (3) transition metal oxides having the structures of perovskite, pyrochlore, etc.; (4) transition metal cluster compounds. However, the intrinsic catalytic activity and stability of the last three kinds of catalysts are lower in comparison with those of platinum and platinum alloys. Therefore, cathodic electrocatalysts now in practical use for PEMFC are mainly those of Pt/C.

In Pt/C electrocatalyst, the size of platinum particle is the main factor influencing the catalytic activity for oxygen reduction. Peukert showed that the specific activity per unit mass of Pt/C electrocatalyst, when particle size of platinum is in the range of 3 to 5 nm, is the highest (M. Peuckert, et al. 1986 *J Electrochem Soc* 133:944–947). The particle size of platinum depends on the method of preparation of the Pt/C electrocatalyst. At present, there are mainly two kinds of method for preparing the Pt/C electrocatalysts. One is called sol-gel method. In this method, chloroplatinic acid is first converted into complex compound of platinum, which is then used to prepare Pt/C electrocatalyst (H. Bonnemann, et al. 1991 *Angew Chem* 103:1344). Said method imposes comparatively strict demands on temperature, concentration of solution, pH value and reaction time. The other one is called impregnation method. Starting directly from chloroplatinic acid, Pt/C electrocatalyst is prepared through different methods (J. B. Goodenough, et al. 1990 *Electrochimica Acta* 15:199–207). In the latter method, chloroplatinic acid solution is diffused into the interstices of active carbon due to capillary action, adsorbed on the active carbon and reduced by reducing agent. As a result, the adsorption capability of chloroplatinic acid will have significant influence on the performance of final catalyst. After the addition of reducing agent, chloroplatinic acid in the bulk solution will be reduced first owing to the existence of hindrance to diffusion. On the other hand, because there exists adsorption equilibrium between chloroplatinic acid adsorbed on active carbon and that in bulk solution, and the adsorption equilibrium will move towards the direction of chloroplatinic acid in bulk solution at this moment, part of the chloroplatinic acid adsorbed on the interstices of the active carbon will be desorbed and will enter the bulk solution. Thus in practice, most of the reduction of the chloroplatinic acid is carried out in the bulk solution. The catalyst obtained by means of such kind of reduction will suffer from the coagulation of platinum particles, lowering of homogeneity of platinum particles and poor supporting on active carbon. It is generally very difficult to prepare nano-catalyst with platinum micro-particles homogeneously distributed on the interstices of the active carbon as well as on the surfaces of the active carbon.

SUMMARY OF THE INVENTION

The objective of the present invention is to provide a method for preparing nano-level Pt/C electrocatalyst for cathode of fuel cell. The method of the present invention can control the adsorption of chloroplatinic acid on active carbon by adding an anchoring agent, which can precipitate the chloroplatinic acid entering the interstices of active carbon in the form of ammonium chloroplatinate or potassium chloroplatinate, thereby inhibiting desorption of chloroplatinic acid from the interstices of active carbon and entering of them into the bulk solution. Consequently, Pt/C electrocatalyst of homogeneous particle size with platinum micro-particles homogeneously distributed in the interstices as well as on the surfaces of the active carbon is obtained. The platinum particle size in the catalyst is mainly in the range of 2.5 to 4.5 nm. The specific activity per unit mass of the said electrocatalyst for catalyzing the reduction of oxygen is high and thus is suitable for use as the catalyst of fuel cell cathode.

According to one aspect of the present invention, a method for preparing the nano-level Pt/C electrocatalyst for cathode of fuel cell is provided. Said method comprises the following steps:

(1) dispersing active carbon in a mixed solvent composed of organic solvent and deionized water to form a suspension, wherein the content of active carbon in the mixed solvent is in the range of 0.1 to 1 g/L;

(2) adding an aqueous solution of anchoring agent into the suspension obtained in step (1) to make anchoring agent adsorbed on the active carbon, wherein the mole ratio of the anchoring agent to chloroplatinic acid which is to be added in the following step is in the range of 3:1 to 6:1;

(3) adding chloroplatinic acid solution into the above mixture to allow chloroplatinic acid adsorbed on the active carbon, wherein the concentration of chloroplatinic acid solution is in the range of 0.1 to 1 g/L, based on the weight of platinum; and (4) adding reducing agent to yield platinum particles after reduction to obtain Pt/C electrocatalyst, wherein the temperature of reduction is in the range of 0 to 80° C.

According to another aspect of the present invention, a method for preparing the nano-level Pt/C electrocatalyst for cathode of fuel cell is provided. Said method comprises the following steps:

(1) dispersing active carbon in a mixed solvent composed of organic solvent and deionized water to form a suspension, wherein the content of active carbon in the mixed solvent is in the range of 0.1 to 1 g/L;

(2) adding an aqueous solution of anchoring agent into the suspension obtained in step (1) to make anchoring agent adsorbed on the active carbon, wherein the mole ratio of the anchoring agent to chloroplatinic acid which is to be added in the following step is in the range of 3:1 to 6:1;

(3) adding chloroplatinic acid solution into the above mixture to allow chloroplatinic acid adsorbed on the active carbon, wherein the concentration of chloroplatinic acid solution is in the range of 0.1 to 1 g/L, based on the weight of platinum;

(4) adjusting the pH value of the above mixture to the range of 5.5 to 10.5 using ammonia water or potassium hydroxide solution; and (5) adding reducing agent to yield platinum particles after reduction to obtain Pt/C electrocatalyst, wherein the temperature of reduction is in the range of 0 to 80° C.

In the method of the present invention, active carbon is firstly dispersed in a mixed solvent to form a suspension with its content in the suspension being from 0.1 to 1 g/L. Said mixed solvent is composed of a polar organic solvent and deionized water. The volume ratio of the organic solvent to deionized water can be in the range of 1:10 to 10:1. The examples of organic solvents suitable to be used in the present invention include, but are not limited to, methanol, ethanol, isopropanol, diethyl ether and acetone.

In the method of the present invention, anchoring agent is first loaded to active carbon carrier before loading chloroplatinic acid. The term "anchoring agent", used in this invention, means compound which can, in a form of suitable salt, deposit the successively added chloroplatinic acid onto the active carbon carrier.

The anchoring agent useful in the present invention can be selected from the group consisting of ammonium chloride, potassium chloride, ammonium bromide, potassium bromide, ammonium iodide, potassium iodide and combination thereof.

Said anchoring agent is generally added in the form of aqueous solution. In principle, there is no limitation to the concentration of anchoring agent solution. For example, the concentration of anchoring agent solution could be from about 1 wt % to saturated concentration, but for the sake of easy operation, the concentration of the aqueous solution of anchoring agent can be generally in the range of 10 to 60 wt. The mole number of the anchoring agent of the present invention is in the range of 3 to 6 times that of the successively added chloroplatinic acid.

Optionally, after the loading of chloroplatinic acid, the pH value of the reacting solution can be adjusted to the range of 5.5 to 10.5 by either ammonia water or potassium hydroxide. Then reducing agent is added. Alternatively, after the loading of chloroplatinic acid, reducing agent in excess amount can directly be added into the reacting solution. The examples of reducing agent suitable to be used in the present invention include, but are not limited to, formaldehyde, formic acid, hydrazine hydrate, sodium borohydride and potassium borohydride. The mole number of reducing agent used is 3 to 6 times that of chloroplatinic acid. The temperature of the reduction reaction can be in the range of 0 to 80° C.

After the reduction reaction is completed, conventional processes of filtration, washing and drying are used to yield nano-level Pt/C electrocatalyst of the present invention. For example, Pt/C electrocatalyst could be obtained after vacuum drying for 1 to 6 hr at the temperature of 80 to 100° C.

According to the present invention, Pt/C electrocatalyst for cathode of fuel cell can be obtained at lower cost and by more simple process and has higher catalytic activity in comparison with those electrocatalysts obtainable by methods of prior art.

The Pt/C electrocatalyst obtainable by the present method can be used as active component in the cathode of fuel cell, especially in the cathode of polymer electrolyte membrane fuel cells.

DETAILED DESCRIPTION OF THE PREFERRED EMBODIMENT

Figure 1:
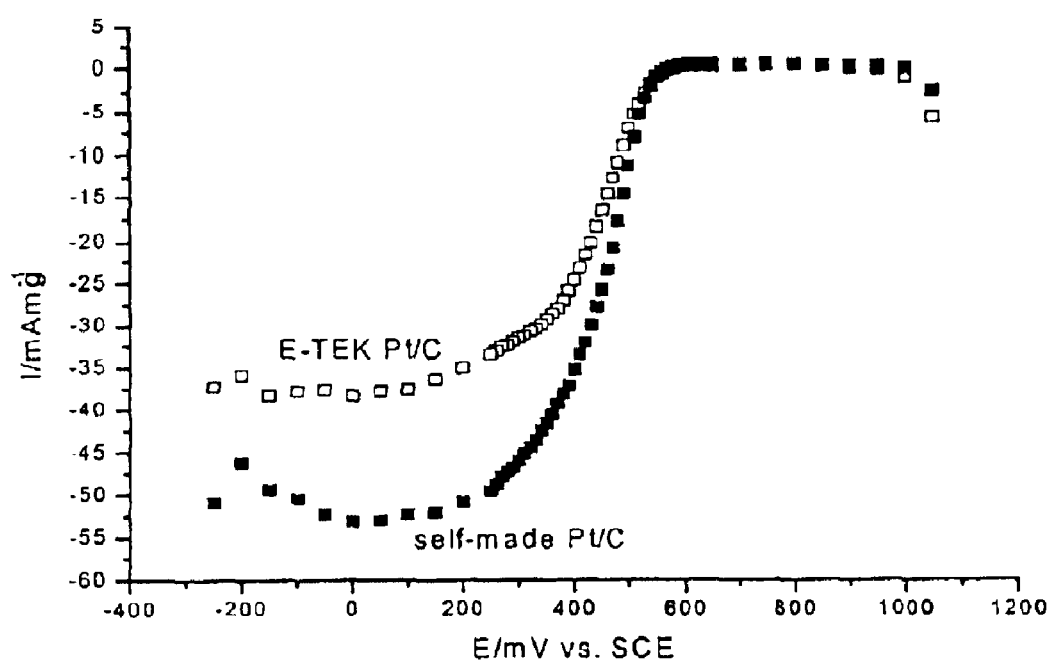
FIG. 1 compares the polarization curve of the Pt/C electrocatalyst obtained in Example 1 with that of E-TEK catalyst.

The present invention is further described with following examples. It is understood that these examples are only illustrative and do not impose any limitations on the scope of the present invention.

EXAMPLE 1

400 mg active carbon was added into 500 mL ethanol/deionized water mixed solvent with volume ratio of ethanol to deionized water being 1:1. The mixture was stirred at room temperature for 1 hr, then 610 mg of 27 wt % aqueous ammonium chloride solution was added, and the stirring was continued for further 1 hr at room temperature. 500 mL chloroplatinic acid solution with platinum content of 0.2 g/L was slowly dropped into the mixture while stirring. Stirring was continued for another 1 hr. Ammonia water (28 wt %) was used to adjust the reacting mixture to pH 9, then 92 mg formaldehyde was slowly dropped into the reacting mixture, and the reduction reaction was carried out for 1 hr at 80° C. The temperature of the reaction mixture was lowered to room temperature. After filtration, the filter cake was washed 3 times with 1000 mL deionized water and was vacuum dried at 80° C. After drying, Pt/C electrocatalyst was obtained with the average size of platinum particles being 3.1 nm as measured in transmission electron microscope. The loading amount of platinum on the catalyst is 20% by weight.

Model 273 Potentiastat manufactured by EG&G Go. (USA), Model 616 Rotating Disk Electrode and conventional three-electrode system were used for electrochemical measurements. 5 mg catalyst and 0.4 mL Nafion solution were put into a 2 mL centrifuge tube and were mixed homogeneously by means of ultrasonic agitation. 5 $\mu$L of the said solution in the tube was transferred using a microsyringe onto the surface of glass carbon electrode (diameter: 5 mm) and was allowed to dry in air at room temperature to yield a working electrode. Reference electrode was a saturated calomel electrode. Counter electrode was a platinum sheet electrode. Electrolyte used was $H_2SO_4$ solution of 0.5 mol/L. Before the experiment, $O_2$ was blown in for 15 min and the blowing of $O_2$ was continued during the experiment to protect the system. Potential scanning rate was selected at 10 $mVs^{-1}$ and the range of scanning was 1.05 to −0.25 V. Difference between the reduction part of the $O_2$ saturated cyclic voltammogram at 1000 rpm and that of $N_2$ saturated cyclic voltammogram at 0 rpm was taken as the polarization curve. All the experiments were carried out at (25±1)° C. The oxygen reduction polarization curve of the catalyst measured in half cell was shown in FIG. 1.

FIG. 1 compares the polarization curve of the Pt/G electrocatalyst obtained in Example 1 with that of E-TEK catalyst, and the latter is a representative catalyst of the prior art. It can been seen from FIG. 1 that the current density of the electrocatalyst of the present invention is higher than that of E-TEK catalyst, and the initiative oxygen reduction potential of the electrocatalyst of the present invention is similar with that of E-TEK catalyst.

EXAMPLE 2

Figure 2:
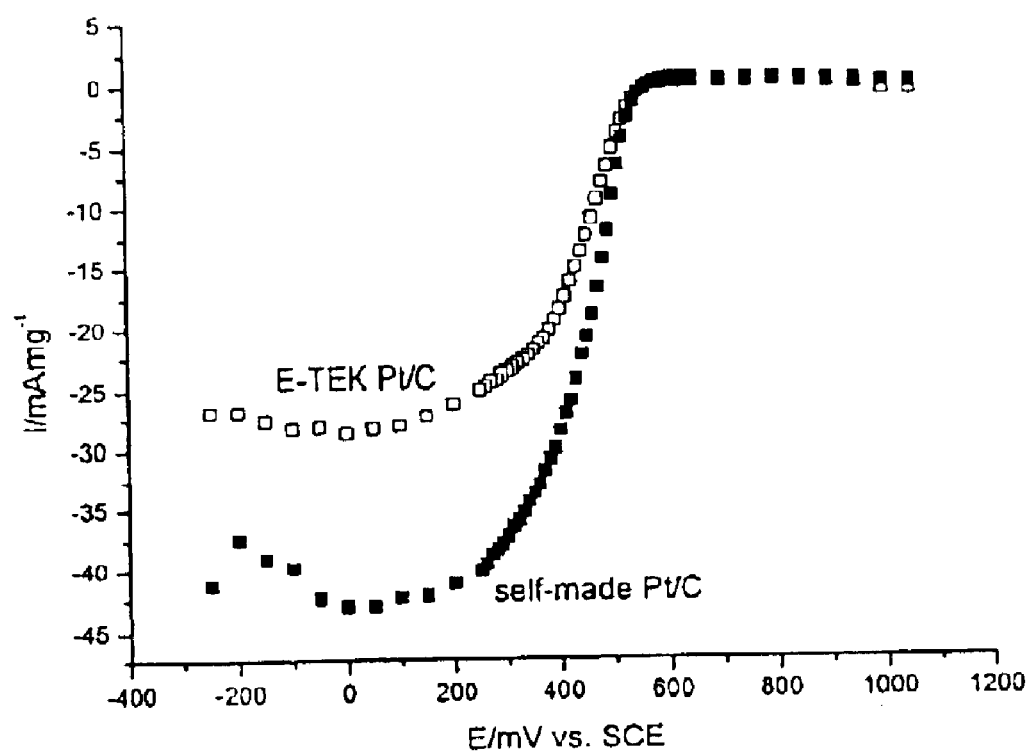
FIG. 2 compares the polarization curve of the Pt/C electrocatalyst obtained in Example 2 with that of E-TEK catalyst.

Procedure of Example 1 was repeated and only the following changes were made. Weight of active carbon used was 500 mg. Anchoring agent used was 2060 mg of 20 wt % aqueous ammonium chloride solution. Platinum content of the chloroplatinic acid solution was 1 g/L. The pH value of the solution was adjusted to pH 8. Reducing agent used was 230 mg of formaldehyde. The loading amount of platinum on the catalyst was 16.7%. The average size of platinum particles in the catalyst was 3.5 nm as measured in transmission electron microscope. The oxygen reduction polarization curve of the catalyst measured in half cell was shown in FIG. 2.

EXAMPLE 3

Figure 3:
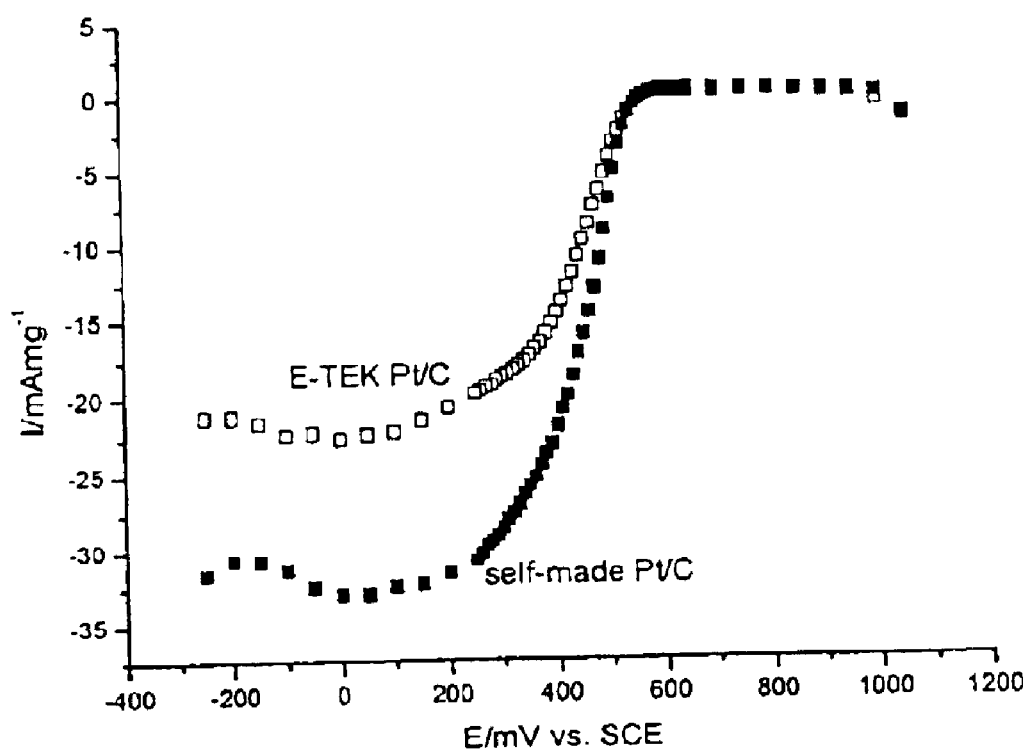
FIG. 3 compares the polarization curve of the Pt/C electrocatalyst obtained in Example 3 with that of E-TEC catalyst.

Procedure of Example 1 was repeated and only the following changes were made. Anchoring agent used was 670 mg of 10 wt % aqueous ammonium chloride solution. Platinum content of the chloroplatinic acid solution was 0.1 g/L. Reducing agent used was 47 mg of formic acid. The pH value of the solution was not adjusted. The reduction temperature was 60° C. The loading amount of platinum on the catalyst was 11.1%. The average size of platinum particles in the catalyst was in the range of 30 nm as measured in transmission electron microscope. The oxygen reduction polarization curve of the catalyst measured in half cell was shown in FIG. 3.

EXAMPLE 4

Figure 4:
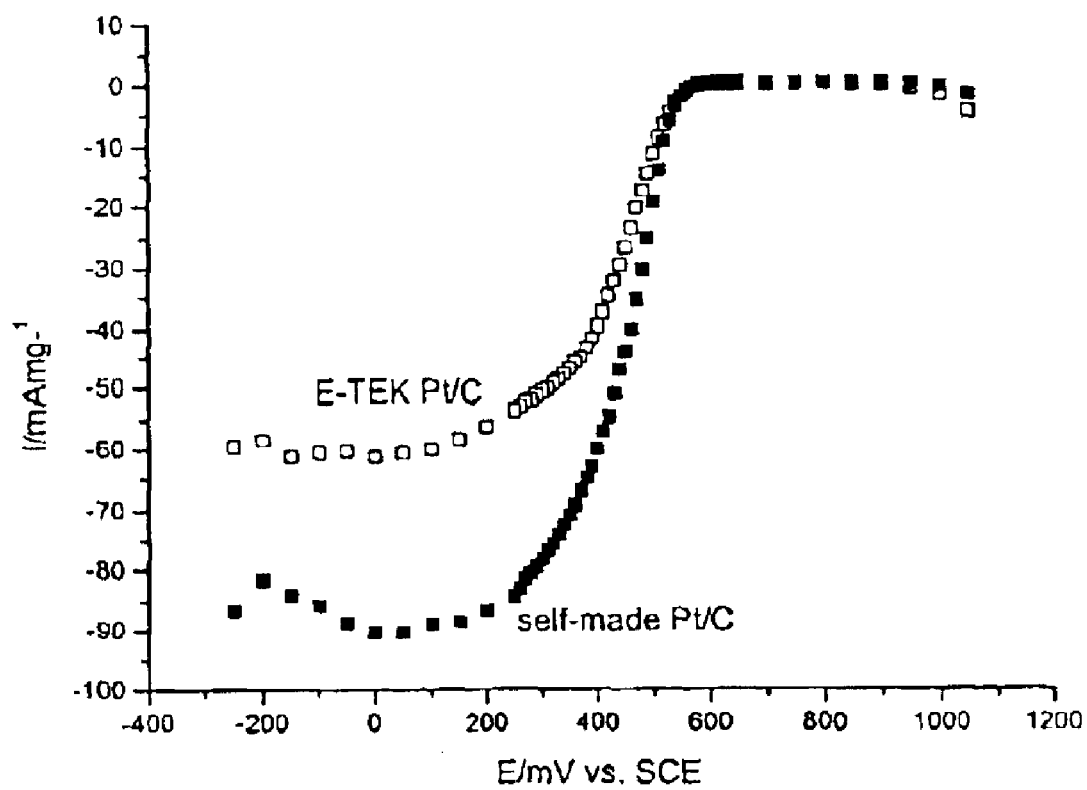
FIG. 4 compares the polarization curve of the Pt/C electrocatalyst obtained in Example 4 with that of E-TEK catalyst.

Procedure of Example 1 was repeated and only the following changes were made. The volume ratio of ethanol to deionized water was changed to 10:1. Weight of aqueous ammonium chloride, was 1020 mg. Platinum content of the chloroplatinic acid solution was 0.5 g/L. Reducing agent used was 192 mg of formaldehyde. The loading amount of platinum on the catalyst was 38.5%. The average size of platinum particles in the catalyst was 4.0 nm as measured in transmission electron microscope. The oxygen reduction polarization curve of the catalyst measured in half cell was shown in FIG. 4.

EXAMPLE 5

Procedure of Example 1 was repeated and only the following changes were made. The mixed solvent used was a mixture of isopropyl alcohol and deionized water with their volume ratio at 3:1. Anchoring agent used was 460 mg of 25 wt % aqueous potassium chloride solution. The pH value of the solution was adjusted to pH 10.5 by potassium hydroxide. The reduction reaction was carried out at 40° C. The loading amount of platinum on the catalyst was 20%. The size of platinum particle in the catalyst was 3.2 nm as measured in transmission electron microscope.

EXAMPLE 6

Figure 5:
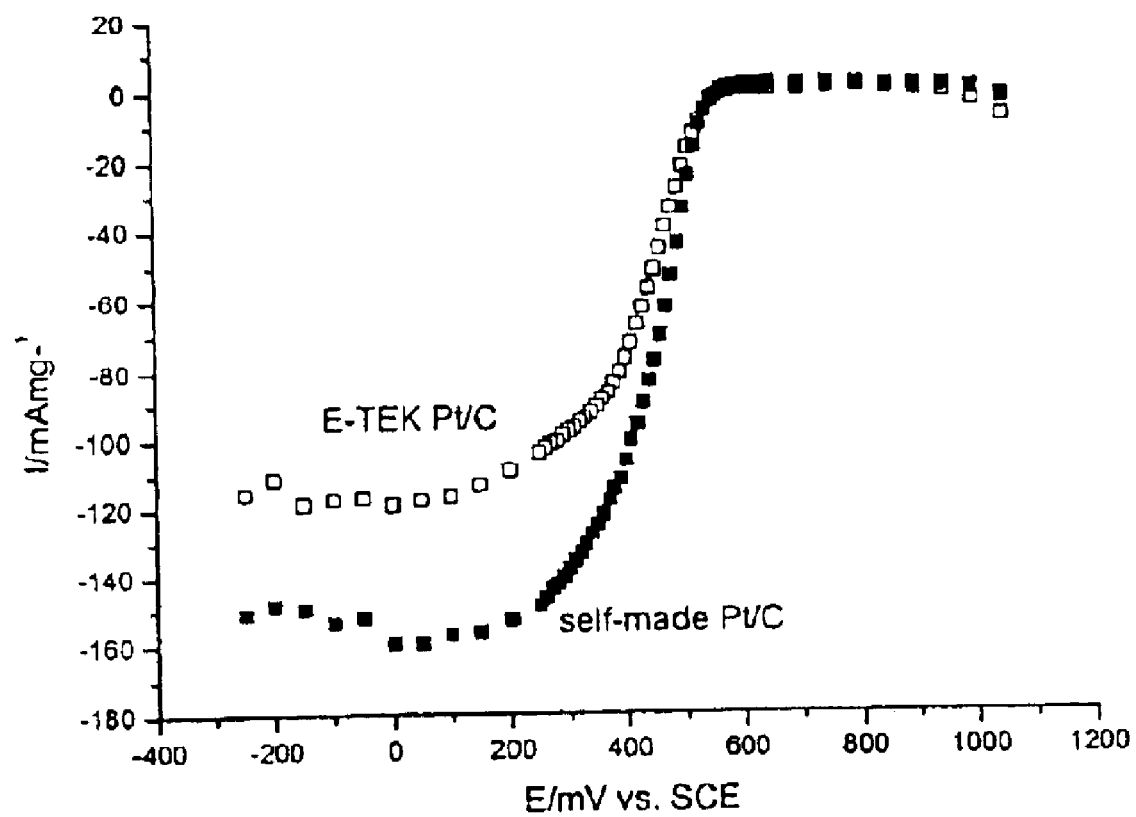
FIG. 5 compares the polarization curve of the Pt/C electrocatalyst obtained in Example 6 with that of E-TEK catalyst.

Procedure of Example 1 was repeated and only the following changes were made. Weight of active carbon used was 50 mg. Mixed solvent used was a mixture of diethyl ether and deionized water with their volume ratio at 5:1. The reducing agent was 59 mg of formic acid. The reduction reaction was carried out at 20° C. The loading amount of platinum on the catalyst was 66.7%. The size of platinum particle in the catalyst was 4.5 nm as measured in transmission electron microscope. The oxygen reduction polarization curve of the catalyst measured in half cell was shown in FIG. 5.

EXAMPLE 7

Procedure of Example 1 was repeated and only the following changes were made. Mixed solvent used was a mixture of methanol and deionized water with their volume ratio at 1:2. The reducing agent used was 58 mg of sodium borohydride. The reduction reaction was carried out at 0° C. The loading amount of platinum on the catalyst was 20%. The size of platinum particle in the catalyst was 3.1 nm as measured in transmission electron microscope.

EXAMPLE 8

Figure 6:
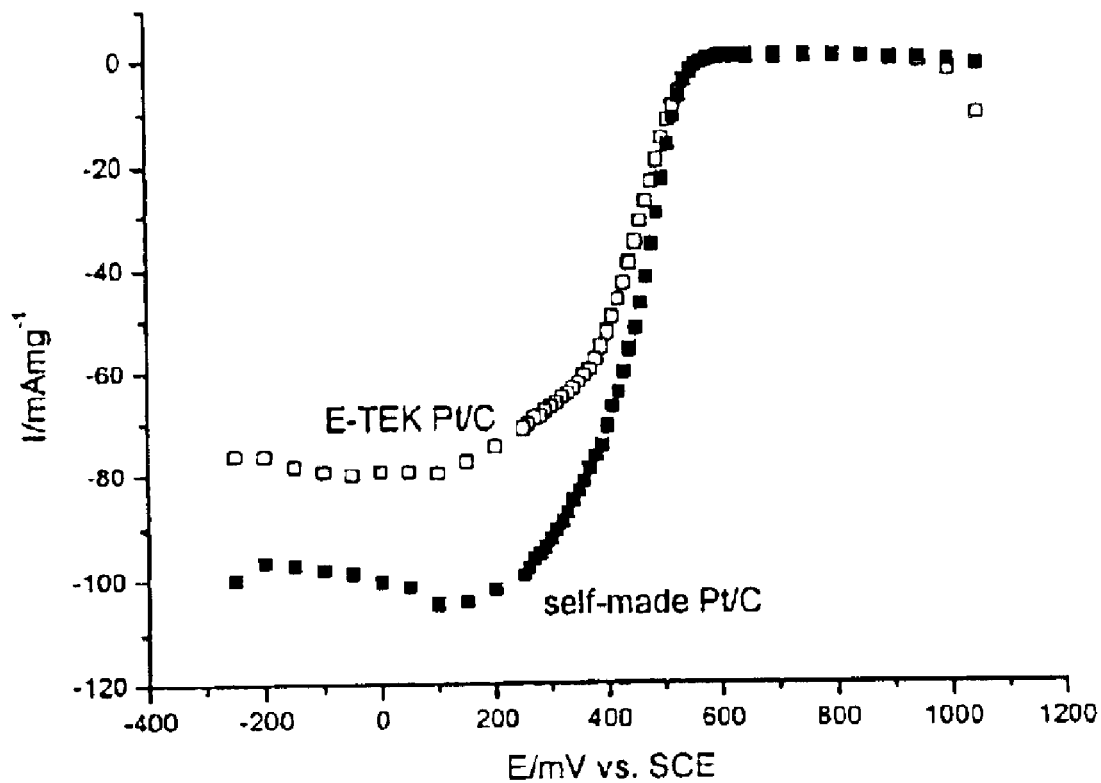
FIG. 6 compares the polarization curve of the Pt/C electrocatalyst obtained in Example 8 with that of E-TEK catalyst.

Procedure of Example 1 was repeated and only the following changes were made. Mixed solvent used was a mixture of ethanol and deionized water with their volume ratio at 1:3. The weight of active carbon used was 200 mg. Platinum content in the chloroplatinic acid was 0.3 g/L. The reducing agent was 208 mg of potassium borohydride. The loading amount of platinum on the catalyst was 42.9%. The size of platinum particle in the catalyst was 4.2 nm as measured in transmission electron microscope. The oxygen reduction polarization curve of the catalyst measured in half cell was shown in FIG. 6.

EXAMPLE 9

Figure 7:
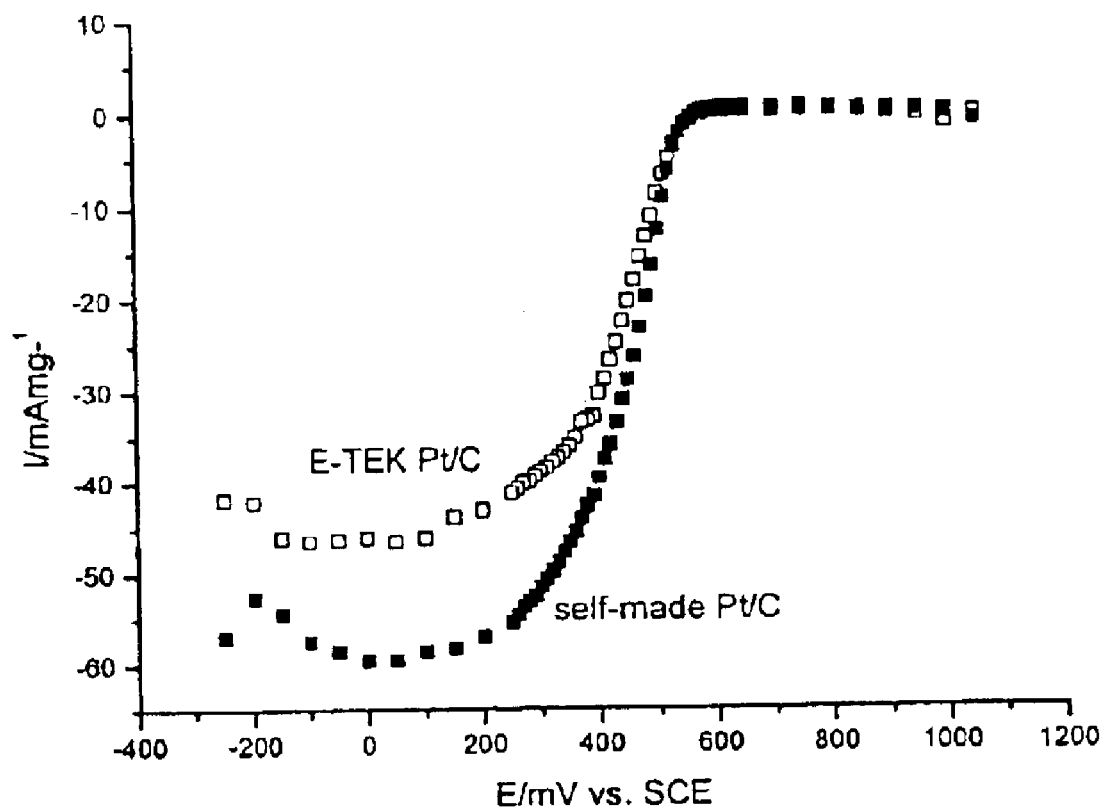
FIG. 7 compares the polarization curve of the Pt/C electrocatalyst obtained in Example 9 with that of E-TEK catalyst.

Procedure of Example 1 was repeated and only the following changes were made. Weight of active carbon used was 300 mg. Mixed solvent used was a mixture of ethanol and deionized water with their volume ratio at 1:5. Anchoring agent used was 580 mg of 59 wt % aqueous potassium iodide solution. The pH value of solution was adjusted to pH 10 by potassium hydroxide. The reduction reaction was carried out at 30° C. The loading amount of platinum on the catalyst was 25%. The size of platinum particle in the catalyst was 3.3 nm as measured in transmission electron microscope. The oxygen reduction polarization curve of the catalyst measured in half cell was shown in FIG. 7.

EXAMPLE 10

Procedure of Example 1 was repeated and only the following changes were made. Mixed solvent used was a mixture of acetone and deionized water with their volume ratio at 1:7. The anchoring agent used was 670 mg of 30 wt % aqueous solution of ammonium bromide. The pH value of the solution was not adjusted. The loading amount of platinum on the catalyst was 20%. The size of platinum particle in the catalyst was 3.0 nm as measured in transmission electron microscope.

EXAMPLE 11

Procedure of Example 1 was repeated and only the following changes were made. Mixed solvent used was a mixture of ethyl ether and deionized water with their volume ratio at 1:8. The anchoring agent used was 625 mg of 39 wt % aqueous solution of potassium bromide. The pH value of the solution was not adjusted. The loading amount of platinum on the catalyst was 20%. The size of platinum particle in the catalyst was 3.1 nm as measured in transmission electron microscope.

EXAMPLE 12

Procedure of Example 1 was repeated and only the following changes were made. Mixed solvent used was a mixture of isopropyl alcohol and deionized water with their volume ratio at 1:10. The anchoring agent used was 470 mg of 60 wt % aqueous solution of ammonium iodide. The reducing agent used was 51 mg of hydrazine hydrate. The loading amount of platinum on the catalyst was 20%. The size of platinum particle in the catalyst was 3.0 nm as measured in transmission electron microscope.

What is claimed is:

1. A method for preparing a nano-level Pt/C electrocatalyst for cathode of a fuel cell, comprising the following steps:
   (1) dispersing active carbon in a mixed solvent, said solvent comprising organic solvent and deionized water, to form a suspension, wherein the content of active carbon in the mixed solvent is between about 0.1 g/L and about 1 g/L;
   (2) adding an aqueous solution of an anchoring agent into the suspension obtained in step (1) thereby obtaining a mixture to make the anchoring agent adsorbed on the active carbon;
   (3) adding chloroplatinic acid solution into the mixture obtained in step (2) to allow chloroplatinic acid adsorbed on the active carbon, wherein the concentration of the chloroplatinic acid solution is between about 0.1 g/L and about 1 g/L based on the weight of platinum, and wherein the mole ratio of the anchoring agent to the chloroplatinic acid is in the range of 3:1 to 6:1; and
   (4) adding a reducing agent, thereby yielding platinum particles after reduction to obtain Pt/C electrocatalyst, wherein the temperature of reduction is between about 0 and about 80° C.

2. The method of claim 1, further comprising adjusting the pH value of the mixture after adding the chloroplatinic acid solution in step (3) to the range of about 5.5 to about 10.5 using ammonia water or potassium hydroxide solution.

3. The method according to claim 2, wherein said fuel cell is a polymer electrolyte membrane fuel cell.

4. The method according to claim 2, wherein said organic solvent is selected from the group consisting of: methanol, ethanol, isopropyl alcohol, diethyl ether and acetone; and wherein the volume ratio of said organic solvent to deionized water within said mixed solvent is between about 1:10 to about 10:1.

5. The method according to claim 2, wherein said anchoring agent comprises at least one of the compounds selected from the group consisting of: ammonium chloride, potassium chloride, ammonium bromide, potassium bromide, ammonium iodide, and potassium iodide.

6. The method according to claim 2, wherein said reducing agent is selected from the group consisting of: formaldehyde, formic acid, hydrazine hydrate, sodium borohydride and potassium borohydride; and wherein the mole number of the reducing agent is 3 to 6 times that of chloroplatinic acid.

7. The method according to claim 1, wherein said fuel cell is a polymer electrolyte membrane fuel cell.

8. The method according to claim 1, wherein said organic solvent is selected from the group consisting of: methanol, ethanol, isopropyl alcohol, diethyl ether and acetone; and wherein the volume ratio of said organic solvent to deionized water within said mixed solvent is between about 1:10 to about 10:1.

9. The method according to claim 1, wherein said anchoring agent comprises at least one of the compounds selected from the group consisting of: ammonium chloride, potassium chloride, ammonium bromide, potassium bromide, ammonium iodide, and potassium iodide.

10. The method according to claim 1, wherein said reducing agent is selected from the group consisting of: formaldehyde, formic acid, hydrazine hydrate, sodium borohydride and potassium borohydride; and wherein the mole number of the reducing agent is 3 to 6 times that of the chloroplatinic acid.

* * * * *

UNITED STATES PATENT AND TRADEMARK OFFICE
CERTIFICATE OF CORRECTION

PATENT NO. : 6,815,391 B2  Page 1 of 1
DATED : November 9, 2004
INVENTOR(S) : Xing et al.

It is certified that error appears in the above-identified patent and that said Letters Patent is hereby corrected as shown below:

<u>Title page,</u>
Item [57], ABSTRACT,
Line 11, after "4.5" delete "mm" and insert -- nm --.

Signed and Sealed this

Second Day of May, 2006

JON W. DUDAS
*Director of the United States Patent and Trademark Office*